United States Patent Office 3,393,199
Patented July 16, 1968

3,393,199
PROCESS FOR PREPARING UNSATURATED
6-MEMBERED LACTAMS
Gerhard Daum, Cologne-Raderberg, Rudolf Modic, Luls-
dorf-Troisdorf, and Hermann Richtzenhain, Cologne-
Sulz, Germany, assignors to Dynamit Nobel Aktienge-
sellschaft, a corporation of Germany
No Drawing. Continuation of application Ser. No.
293,742, July 29, 1963. This application Sept. 19,
1966, Ser. No. 580,501
Claims priority, application Germany, July 31, 1962,
D 39,502
5 Claims. (Cl. 260—294.9)

This is a continuation of copending application Ser. No. 293,742, filed July 29, 1963, now abandoned.

This invention relates to the preparation of unsaturated 6-membered lactams by rearrangement of cyanethylated ketones.

The preparation of unsaturated 6-membered lactams from α-cyanethylated ketones has already been disclosed. The α-cyanethylated ketones, on being heated together with organic acids at temperatures of 140–200° C., undergo rearrangement to form compounds which correspond to structural Formula III as set out hereinafter.

This invention has as its object an improvement in the rearrangement of α-cyanethylated ketones and more particularly of ketones substituted in the α-position by at least one β-cyanethyl group.

Another object of this invention is a practical and simple method for the rearrangement of ketones substituted in the α-position by at least one β-cyanethyl group to form 6-membered lactams.

A still further object of this invention is the preparation of other and novel forms of the compound identified by the Formula III as well as further novel 6-membered lactams.

Other objects will appear hereinafter.

These objects are accomplished in accordance with the invention by heating at an elevated temperature a ketone substituted in the α-position by at least one β-cyanethyl group in the presence of an alkaline agent, such as an alkali metal, alkali or alkaline earth metal hydroxide, alcoholate, or an organic base.

The reaction sequence is set forth in the following equations:

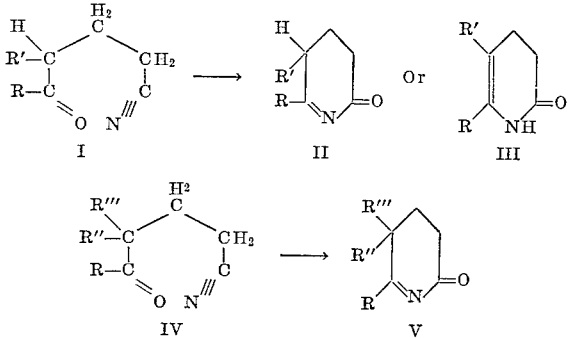

wherein R is a hydrocarbon radical which may be substituted, such hydrocarbon radical may be selected from the group consisting of alkyl radicals, cycloalkyl radicals and aromatic radicals. Examples of such radicals include methyl, t-butyl, cyclohexyl, phenyl, and the like; R′ represents hydrogen, a hydrocarbon radical, or a substituted hydrocarbon radical, which may as well be selected from the group: consisting of alkyl radicals, cycloalkyl radical and aromatic radicals. Examples of such radicals include methyl, ethyl, isopropyl, cyclohexyl, phenyl, β-cyanethyl, p-methoxyphenyl and the like; and R″, and R‴ may each represent the same unsubstituted or substituted hydrocarbon radicals as R′. Whenever two of the groups, R′ and R″ are attached to adjacent positions, they may be taken together with the carbon atoms to which they are attached to form a ring.

The present treatment is applicable to cyanethylation products of ketones which represents products of the reaction of acrylonitrile with ketones having at least one hydrogen atom on one of the carbon atoms adjacent the carbonyl group that is capable of reaction with acrylonitrile. Examples of α-cyanethylated ketones of this kind useful in the practise of this invention are: the cyanethylation products of aliphatic ketones, such as mono-, di- and tri-(β-cyanethyl-) acetone, 3-mono-, and 3,3-di-(β-cyanethyl-) butanone-2, cycloaliphatic ketones such as 2-(β-cyanethyl-) cyclopentanone and cyclohexanone, aliphatic aromatic ketones, such as α-(β-cyanethyl-) acetophenone. The invention, however, is not restricted to these compounds.

The products of the rearrangement of α-(β-cyanethyl-) acetone or of 3-(β-cyanethyl-) butanone-2 prepared in accordance with the process of the instant invention are identical with the rearrangement products prepared by the known process.

Whether structural Formula II or III is to be attributed to the rearrangement products of I has not as yet been clearly established. Structural Formula V, however, can definitely be attributed to the rearrangement products of cyanethylated ketones of structural Formula IV.

The rearrangement of the cyanethylated ketone starting materials can be carried out according to the present invention by heating a cyanethylated ketone in the presence of an alkaline agent as for instance an alkali metal, an alkali metal or alkaline earth metal hydroxide or alcoholate, or an organic base, such as, for example, a tetraalkylammonium hydroxide, for instance trimethylbenzylammonium hydroxide. The amount of alkaline agent used is the catalytic quantity. It is possible in accordance with less than 0.1 mol, preferably 0.01–0.08 mol, of the alkaline agent per mol of cyanethylated ketone. In some cases, the yield of rearrangement products can be further increased by carrying out the reaction in the presence of ammonia in addition to the alkaline agent. The rearrangement is effected by heating the ketone and alkaline agent at a temperature of between 50 and 200° C.

The rearrangement can be advantageously carried out in the presence of a solvent. Instances of particularly suitable solvents are those which act to dissolve the alkaline agents and include the lower alcohols, as for instance methanol, ethanol, amyl alcohol etc, and ether-alcohols, such as glycol-methylether, glycol-ethylether, glycol-butylether and the like.

The process of the invention has the considerable advantage over the known process that no acid is required for the production of the lactams and hence no acid-resistant apparatus need be employed. Furthermore, in accordance with the present invention it is also possible to rearrange cyanethylated ketones which do not carry hydrogen atoms on the carbon atom bearing the β-cyanethyl group. The rearrangement of such ketones is impossible in accordance with the known process because of the different reaction mechanism therein involved.

The unsaturated lactams prepared by the process of the invention are suitable as intermediate products for the manufacture of plastics, plastic products, textile adjuvants, pharmaceuticals and pesticides.

The more detailed practice of the invention is illustrated by the following examples. There are, of course, many forms of the invention other than these specific embodiments.

Example 1

500 grams of α,α,α-tri(β-cyanethyl)-acetone (M.P. 154–155° C.) are heated with a solution of 7 grams sodium in 1000 ml. ethanol for 6 hours under reflux. After cooling, 435 grams (87% of theory) of 2-oxo-5,5-di-(β-cyanethyl)-6-methyl-2,3,4,5-tetrahydropyridine are recovered by filtering. The melting point of the 2-oxo-5,5-di-(β - cyanethyl)-6-methyl-2,3,4,5-tetrahydropyridine after recrystallization from acetone is 222–223° C.

Analysis.—$C_{12}H_{15}N_3O$: Calculated: C, 66.33; H, 6.96; N, 19.35. Found: C, 66.26; H, 7.12; N, 19.61. Molecular weight: 217.26.

Example 2

21 grams of α,α-di(β-cyanethyl)-acetone are refluxed with 50 ml. of amyl alcohol and a solution of 0.2 g. sodium in 15 ml. ethanol for 6 hours. Upon cooling, 11 g. (53% of theory) of 2-oxo-5-(β-cyanethyl)-6-methyl-2,3,4,5-tetrahydropyridine or 2-oxo-5-(β-cyanethyl)-6-methyl-1,2,3,4-tetrahydropyridine separate out in the form of yellow crystals. The yellow crystals are recovered by suction filtering and washed with acetic acid ester and ether. The melting point of the isolated lactam following recrystallization from water is 166° C.

Analysis.—$C_9H_{12}N_2O$: Calculated: C, 65.83; H, 7.37; N, 17.06. Found: C, 65.94; H, 7.25; N, 17.19. Molecular weight: 164.20.

Example 3

91 grams of α-(β-cyanethyl)-acetone are heated with a solution of 0.5 g. sodium and 88 g. ammonia in 400 ml. methanol in an autoclave at 120° C. The ammonia and solvent are distilled off and the residue vacuum distilled. 74 g. of 2-oxo-6-methyl-1,2,3,4-tetrahydropyridine, or 2-oxo-6-methyl-2,3,4,5-tetrahydropyridine (81% of theory) having a $B.P._{12}$ of 130–140° C. are obtained. The melting point of the lactam following recrystallization from acetic acid ester is 117–118° C.

In its analysis, properties and mixed melting point, the product is identical with the one obtained by acid conversion and which was designated as 2-oxo-6-methyl-1,2,3,4-tetrahydropyridine.

Example 4a 44 grams of 3,3-di-(β-cyanethyl)-butanone-2 are heated with a solution of 0.5 g. sodium in 100 ml. ethanol under reflux for 8 hours. Upon cooling, 35 grams (79.5% of theory) 2-oxo-5-(β-cyanethyl)-5,6-dimethyl-2,3,4,5-tetrahydropyridine settle out. The melting point, of the lactam, after recrystallization from ethanol is 157–158° C.

Analysis.—$C_{10}H_{14}N_2O$: Calculated: C, 67.38; H, 7.92; N, 15.72. Found: C, 67.69; H, 7.94; N, 15.84. Molecular weight: 178.23.

Example 4b 44 grams of 3,3-di-(β-cyanethyl)-butanone-2 are refluxed for 8 hours with 100 ml. amyl alcohol and 2 ml. of a 30% solution of trimethylbenzylammoniumhydroxide. After cooling, 30 g. (68% of theory) of the reaction product described under Example 4a are obtained.

Example 5

31 grams of 3-(β-cyanethyl)-butanone-2 are heated with a solution of 0.2 g. sodium and 31 g. ammonia in 150 ml. of methanol for 5 hours at 120° C. in an autoclave. After driving off the ammonia and concentrating the methanol solution, 17 g. (55% of theory) of 2-oxo-5,6-dimethyl-1,2,3,4-tetrahydropyridine, or 2-oxo-5,6-dimethyl-2,3,4,5-tetrahydropyridine are obtained. The melting point of the recovered lactam product after recrystallization from acetone amounts to 130–131° C.

On the basis of analysis, characteristics and mixed melting point, the product is identical with the product obtained by acid conversion and designated as 2-oxo-5,6-dimethyl-1,2,3,4-tetrahydropyridine.

Example 6

30 grams of α-(β-cyanethyl)-cyclohexanone are heated under reflux for 5 hours with a solution of 0.7 g. potassium hydroxide in 50 ml. ethanol. Following the distilling off of the alcohol, there is obtained 2-oxo-2,3,4,10,5,6,7,8-octahydroquinoline. The melting point of the lactam following recrystallization from methanol is 139° C. On the basis of its analysis, properties, and mixed melting point, this product is identical with the product obtained by acid conversion and designated as 2-oxo-1,2,3,4,5,6,7,8-octahydroquinoline.

Example 7

24 grams of ω-(β-cyanethyl)-acetophenone are heated with a solution of 0.2 g. sodium and 23 g. ammonia in 100 ml. methanol for 8 hours at 140° C. in an autoclave. After driving off the ammonia, the concentrated solution is neutralized with dilute hydrochloric acid. Ethanol is removed by distillation. A brown mass remains from which 5.6 g. (23% of theory) of 2-oxo-6-phenyl-1,2,3,4-tetrahydropyridine or 2-oxo-6-phenyl-2,3,4,5-tetrahydropyridine are obtained which following recrystallization from methanol (with activated charcoal) has a melting point of 152–154° C. On the basis of its properties and mixed melting point, the product is identical with the one obtained by acid conversion and designated as 2-oxo-6-phenyl-1,2,3,4-tetrahydropyridine.

What is claimed is:

1. An unsaturated 6-membered lactam selected from the group consisting of

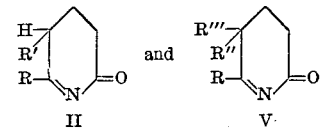

wherein R is a member selected from the group consisting of methyl, cyclo-aliphatic ketones having at least 5 carbon atoms and phenyl lower alkyl substituted ketones, R' is a member selected from the group consisting of cyanethyl, methyl, cycloaliphatic ketones having at least 5 carbon atoms and phenyl lower alkyl substituted ketones, and R'' and R''' are each selected from the group consisting of cyanethyl, methyl, cycloaliphatic ketones having at least 5 carbon atoms and phenyl lower alkyl substituted ketones where said substituent is a cyclic moiety which contains one member of the group consisting of R and R', R and R'', and R' and R'''.

2. The process for producing 2-oxo-5,5-di-(β-cyanethyl) - 6 - methyl-2,3,4,5-tetrahydropyridine which comprises heating α,α,α-tri(β-cyanethyl)-acetone in the presence of a solution of sodium in ethanol at a temperature within the range of 50–200° C. and recovering the lactam formed.

3. The process for producing 2-oxo-6-methyl-1,2,3,4-tetrahydropyridine which comprises heating α-(β-cyanethyl)-acetone at a temperature of from 50–200° C. in the presence of a solution of sodium and ammonia in methanol and recovering the lactam formed.

4. The process for producing 2-oxo-6-phenyl-1,2,3,4-tetrahydropyridine which comprises heating ω-(β-cyanethyl)-acetophenone at a temperature of from 50–200° C. in the presence of a solution of sodium and ammonia in methanol and recovering the lactam formed.

5. The process for producing an unsaturated 6-membered lactam which comprises heating a member selected from the group consisting of α,α,α-tri-(β-cyanethyl)-acetone, α-(β-cyanethyl)-acetone and ω-(β-cyanethyl)- acetophenone, at a temperature within the range of 50–200° C. in the presence of a solution of sodium ethanol (for said first group member) and sodium and ammonia in methanol (for said second and third group members).

References Cited

FOREIGN PATENTS 1,092,919   11/1960   Germany.

OTHER REFERENCES

Klingsberg, Pyridine and Derivatives, Part III, pp. 519–20 (Interscience) (1962), QD–401–K5.

Noller, "Chemistry of Organic Compounds," 2nd ed., pp. 252–254 (Saunders), QD–253–N65.

NICHOLAS S. RIZZO, *Primary Examiner.*

D. DAUS, *Assistant Examiner.*